(12) United States Patent
Fukuda

(10) Patent No.: US 7,859,717 B2
(45) Date of Patent: Dec. 28, 2010

(54) METHOD FOR SETTING IMAGE-PROCESSING PARAMETER VALUE

(75) Inventor: Tatsuya Fukuda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 11/385,517

(22) Filed: Mar. 21, 2006

(65) Prior Publication Data
US 2006/0221408 A1 Oct. 5, 2006

(30) Foreign Application Priority Data
Apr. 1, 2005 (JP) ............................. 2005-106288

(51) Int. Cl.
G06F 15/00 (2006.01)
G06K 15/00 (2006.01)
H04N 1/40 (2006.01)

(52) U.S. Cl. ...................... 358/1.9; 358/1.18; 358/448

(58) Field of Classification Search ................ 358/1.18, 358/448, 1.9, 1.15, 487
See application file for complete search history.

(56) References Cited

U.S. PATENT DOCUMENTS

| | | | |
|---|---|---|---|
| 4,831,434 A * | 5/1989 | Fuchsberger | ................ 358/521 |
| 6,535,298 B2 | 3/2003 | Winter | |
| 6,956,671 B2 | 10/2005 | Monty | |
| 7,397,572 B1 * | 7/2008 | Horii | .......................... 358/1.13 |
| 7,536,036 B2 * | 5/2009 | Steinberg et al. | ............ 382/117 |
| 2004/0227977 A1 * | 11/2004 | Yoshida | ..................... 358/3.01 |

FOREIGN PATENT DOCUMENTS

JP 2002-273973 A 9/2002

* cited by examiner

*Primary Examiner*—Benny Q Tieu
*Assistant Examiner*—Sunil Chacko
(74) *Attorney, Agent, or Firm*—Canon U.S.A., Inc. I.P. Division

(57) ABSTRACT

An image processing device includes an image processing unit that produces a plurality of sample images of a certain image in correspondence to values for at least one parameter for processing the certain image; a sheet forming unit that forms a setting sheet used for setting the at least one parameter, the setting sheet including the sample images arranged in a predetermined order, the number of the sample images being smaller than the number of the values for the at least one parameter; and a printing unit that prints the setting sheet formed by the sheet forming unit. Accordingly, even if there are many image-processing parameters or if the allowable range of the value for each parameter is wide, the image-processing parameter values can be readily set.

10 Claims, 8 Drawing Sheets

METHOD FOR SETTING IMAGE-PROCESSING PARAMETER VALUE

BACKGROUND OF THE INVENTION

1. Field of the Invention

The present invention relates to a method for setting an image-processing parameter value when image data captured with a digital camera and stored in a storage medium is to be read out and printed.

2. Description of the Related Art

The demand for the ability to domestically print out images captured with digital cameras has increased with the recent popularization of digital cameras. Generally, in order to print out an image captured with a digital camera, a personal computer (which will be referred to as a PC hereinafter) is connected to a storage-medium reading device (which will be referred to as a memory card reader hereinafter). Moreover, a storage medium (which will be referred to as a memory card hereinafter) storing the image captured with the digital camera is installed in the memory card reader, and the image data is then downloaded into the PC. By connecting the PC to a printer, the image data can be printed out.

Direct printers and multifunction printers that provide multiple functions in a single unit (which will be referred to as an MFP hereinafter) are commercially available as user-friendly printers for users that are not accustomed to operating PCs. These printers are provided with a memory card slot for inserting a memory card storing images captured with a digital camera. Moreover, these printers are also provided with an operating portion, which may be operated for selecting the image to be printed, the paper size, or the number of prints to be made. Accordingly, these printers provide easy printing even for users that are not accustomed to operating PCs.

Moreover, as an easy method for designating the settings in MFPs for a printing operation, Japanese Patent Laid-Open No. 2002-273973 discloses an example that applies a setting sheet for designating the settings for a printing operation. Specifically, a print-setting sheet is first printed in a manner such that the print-setting sheet shows a list of images stored in a memory card installed in the MFP and marking areas for selecting the images. The user may put a check mark in a marking area corresponding to an image to be printed. The marked print-setting sheet is then set on a document holder of the MFP. The sheet is scanned so that the mark is detected. Subsequently, the image corresponding to the detected mark is printed. By performing this series of steps, the user can readily obtain a print of the desired image.

Furthermore, for a selected image file, a plurality of samples having different image-processing parameter values is printed out in an arranged form. One of the samples is selected and marked. The image-processing parameter value corresponding to the sample selected on the print-setting sheet is used for processing the selected image, and a print of the selected image is obtained.

However, according to the method for designating an image-processing parameter value disclosed in Japanese Patent Laid-Open No. 2002-273973, since the printing operation for the selected image is performed after selecting one of the samples having different image-processing parameter values, a large number of samples must be printed at one time if there are many image-processing parameters or if the allowable range of the value for each parameter is wide. This is problematic in leading to high consumption of paper and recording materials, such as ink. For example, if there are two types of settable image-processing parameters and each type consists of nine settable levels, 81 samples (9×9) must be printed in order to cover all selectable combinations of the parameter values. This not only leads to high consumption of the recording materials but also requires a large amount of time for printing out the setting sheet. On the other hand, if the number of samples is reduced in order to hold down the consumption of paper and recording materials, some selectable combinations of the parameter values will be missing since some of the samples will not be printed out. Consequently, this will limit the selectable number of the samples. As a result, even though some values should originally be settable, since not all of the samples are printed out, there may be cases where the printing operation must be performed based on inappropriate image-processing parameter values.

In known image processing systems, when there are multiple combinations in the settings of image-processing parameter values, there are problems related with high consumption of recording materials and inappropriate settings of image-processing parameter values due to the limited number of samples with respect to the paper size. Therefore, there is a need for an image processing system in which the value can be set more precisely for the image-processing parameter. In particular, if there are many image-processing parameters or if the allowable range of the value for each parameter is wide, the value for each parameter should be capable of being readily set with high precision, thus increasing the level of convenience for users.

SUMMARY OF THE INVENTION

The present invention provides a method that allows easy setting of image-processing parameter values even if there are many image-processing parameters or if the allowable range of the value for each parameter is wide.

According to an aspect of the present invention, an image processing device is provided. The image processing device includes an image processing unit that produces a plurality of sample images of a certain image in correspondence to values for at least one parameter for processing the certain image; a sheet forming unit that forms a setting sheet used for setting the at least one parameter, the setting sheet including the sample images arranged in a predetermined order, the number of the sample images being smaller than the number of the values for the at least one parameter; and a printing unit that prints the setting sheet formed by the sheet forming unit.

According to another aspect of the present invention, a method for processing an image is provided. The method includes an image processing step for producing a plurality of sample images of a certain image in correspondence to values for at least one parameter for processing the certain image; a sheet forming step for forming a setting sheet including the sample images arranged in predetermined positions, the number of the sample images being smaller than the number of the values for the at least one parameter; and a printing step for printing the setting sheet formed in the sheet forming step.

According to yet another aspect of the present invention, an image processing device is provided. The image processing device includes a reading unit that reads a mark provided on a setting sheet having a plurality of sample images arranged in predetermined positions, the sample images being processed based on at least one predetermined parameter; a detecting unit that detects the position of the mark read by the reading unit; and an image processing unit that processes a certain image corresponding to one of the sample images, the sample image corresponding to one of values for the at least one parameter, the value corresponding to the position of the mark detected by the detecting unit.

According to still another aspect of the present invention, a method for processing an image is provided. The method includes a reading step for reading a mark provided on a setting sheet having a plurality of sample images arranged in predetermined positions, the sample images being processed based on at least one predetermined parameter; a detecting step for detecting the position of the mark read in the reading step; and an image processing step for processing a certain image corresponding to one of the sample images, the one of the sample images corresponding to one of values for the at least one parameter, the one of values corresponding to the position of the mark detected in the detecting step.

Further features of the present invention will become apparent from the following description of exemplary embodiments (with reference to the attached drawings).

DESCRIPTION OF THE EMBODIMENTS

Exemplary embodiments of the present invention will be described below with reference to the drawings.

First Embodiment

Figure 1:
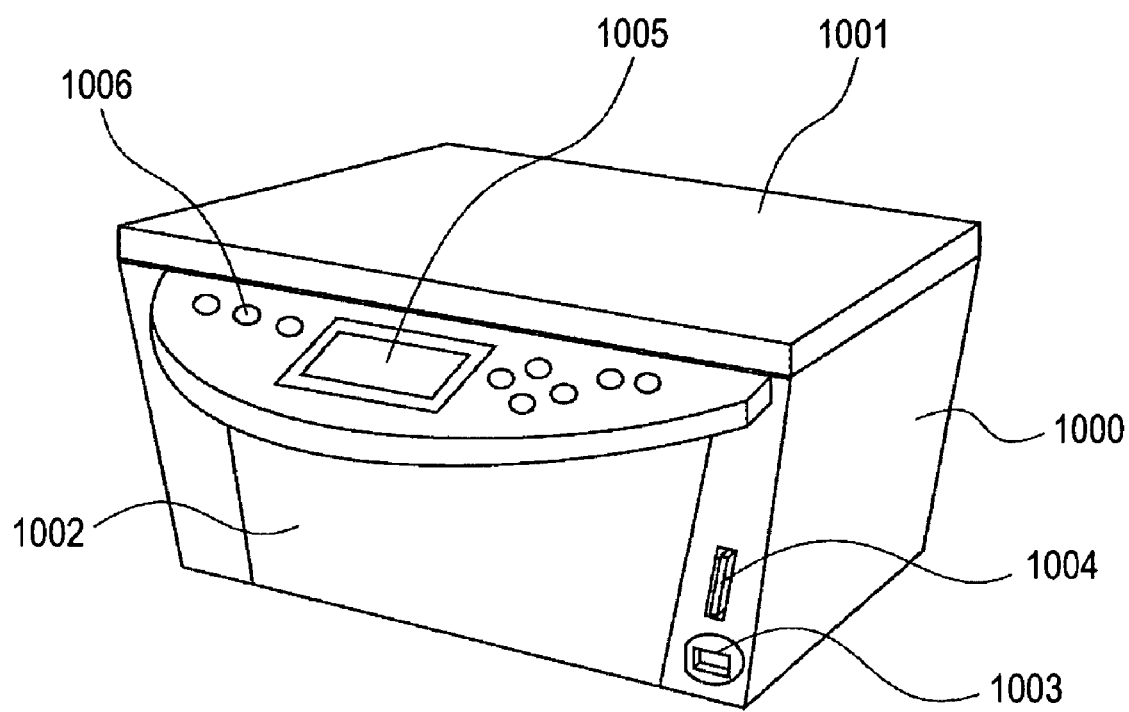
FIG. 1 is a perspective view of an MFP according to an exemplary embodiment of the present invention.

FIG. 1 is a perspective view of a multifunction printer 1000 (which will be referred to as an MFP 1000 hereinafter) according to an exemplary embodiment of the present invention. The MFP 1000 has the following functions: a PC-printer function for printing data received from a host computer (PC); a scan function for scanning a document set on a document holder in response to an operation command from the PC; a copy function for copying the document set on the document holder and printing a copy of the document; a function for reading image data stored in a memory card and printing the image data; and a function for receiving image data from a digital camera and printing the image data. In FIG. 1, an upper cover 1001 is shown in its closed state. By opening the upper cover 1001, a document can be set on the document holder. The document and the document holder are not shown in the drawing. In FIG. 1, a catch tray 1002 is shown in its closed state. When a printing operation is performed, the catch tray 1002 is opened so as to collect the printed sheets. A connector 1003 is used for connecting to a digital camera (not shown). By connecting the connector 1003 to a digital camera, the MFP 1000 can directly read out image data stored in a memory contained in the digital camera and print out the image data. A memory card can be inserted into a card slot 1004. The MFP 1000 reads out the image data stored in the memory card and prints out the image data. The memory card may be, for example, a CompactFlash® memory, SmartMedia, or a Memory Stick. The MFP 1000 shown in FIG. 1 also includes a liquid-crystal display (LCD) 1005. For example, when searching for an image to be printed from image data stored in the memory card, the LCD 1005 displays a list of images or thumbnail images. Moreover, when a copy operation is to be performed by the MFP 1000, the LCD 1005 displays settings for, for example, the paper size, the magnification, and the copy density, and also displays, for example, an operating screen for a maintenance function of the MFP 1000. Furthermore, when a certain failure occurs in the MFP 1000, the LCD 1005 displays a screen that shows the condition of the MFP 1000, or when a restricted operation is performed, the LCD 1005 displays a guidance screen. An operating portion 1006 is used for operating the MFP 1000. The operating portion 1006 includes a plurality of operating keys, such as up and down keys, left and right keys, a copy mode key, and a print start key. By pressing one of these keys, the MFP 1000 is operated in conjunction with the screen displayed on the LCD 1005. The MFP 1000 is provided with another connector (not shown) on the back surface thereof for connecting to a PC. The MFP 1000 receives print data from the PC via the connector so as to function as a PC printer. Furthermore, the MFP 1000 can also function as a scanner that scans a document set on the document holder in response to an operation command from the PC.

Figure 2:
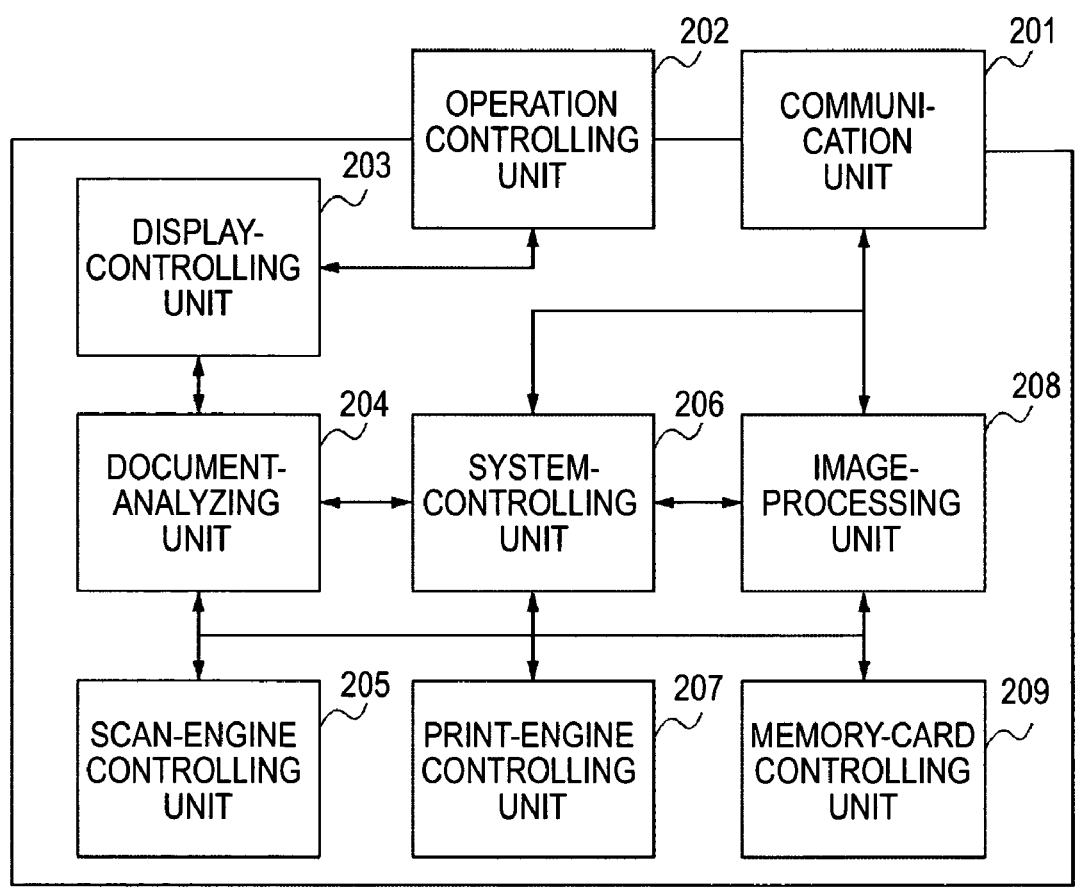
FIG. 2 is a functional block diagram of the MFP according to the exemplary embodiment of the present invention.

FIG. 2 is a functional block diagram of the MFP 1000 according to the exemplary embodiment of the present invention. A communication unit 201 is for controlling the data communication with the PC connected to the PC connector (not shown) or for controlling the data communication with the digital camera connected to the digital-camera connector 1003. An operation-controlling unit 202 detects the pressing of each key of the operating portion 1006 of the MFP 1000, converts the detection to a logical key-operation message, and sends the message to a display-controlling unit 203. In response to the key-operation message from the operation-controlling unit 202, the display-controlling unit 203 commands the LCD 1005 to display the settings, such as the number of copies and the paper size. A document-analyzing unit 204 analyzes the document on the document holder that is made into data by a scan-engine controlling unit 205. The document-analyzing unit 204 reads out a mark designated on a setting sheet, produces photo-printing setting information and image-processing setting information, and starts a photo-printing operation. The scan-engine controlling unit 205 controls the scanning operation of a copying document or a setting-sheet document and is also used for a PC scanning operation. A system-controlling unit 206 is provided for regulating each of the controlling units, and performs exclusive control of physical resources, sequence control, and management of the MFP 1000 for, for example, the ink level and against various types of errors. A print-engine controlling unit 207 is for controlling various printing processes, such as a photocopying process, a printing process of image data from a digital camera or a memory card, and a PC-printing process. Therefore, the print-engine controlling unit 207 controls, for example, the discharging of ink droplets, the feeding and ejecting of paper, and the operation of the print head. An image-processing unit 208 converts print data received from the PC and sends the data to the print-engine controlling unit 207. Moreover, the image-processing unit 208 also performs expanding of a printing image file received from a digital camera or a memory card, and other image processing, such as print layout setting, scaling, coloring, binarizing, brightness and color saturation adjustments, and red-eye correction. A memory-card controlling unit 209 reads/writes an image file stored in a memory card inserted in the card slot 1004. Moreover, the memory-card controlling unit 209 analyzes the image data stored in the memory card and also performs, for example, directory management.

A procedure for setting image-processing parameter values using a setting sheet will be described below based on the above configuration.

Figure 3:
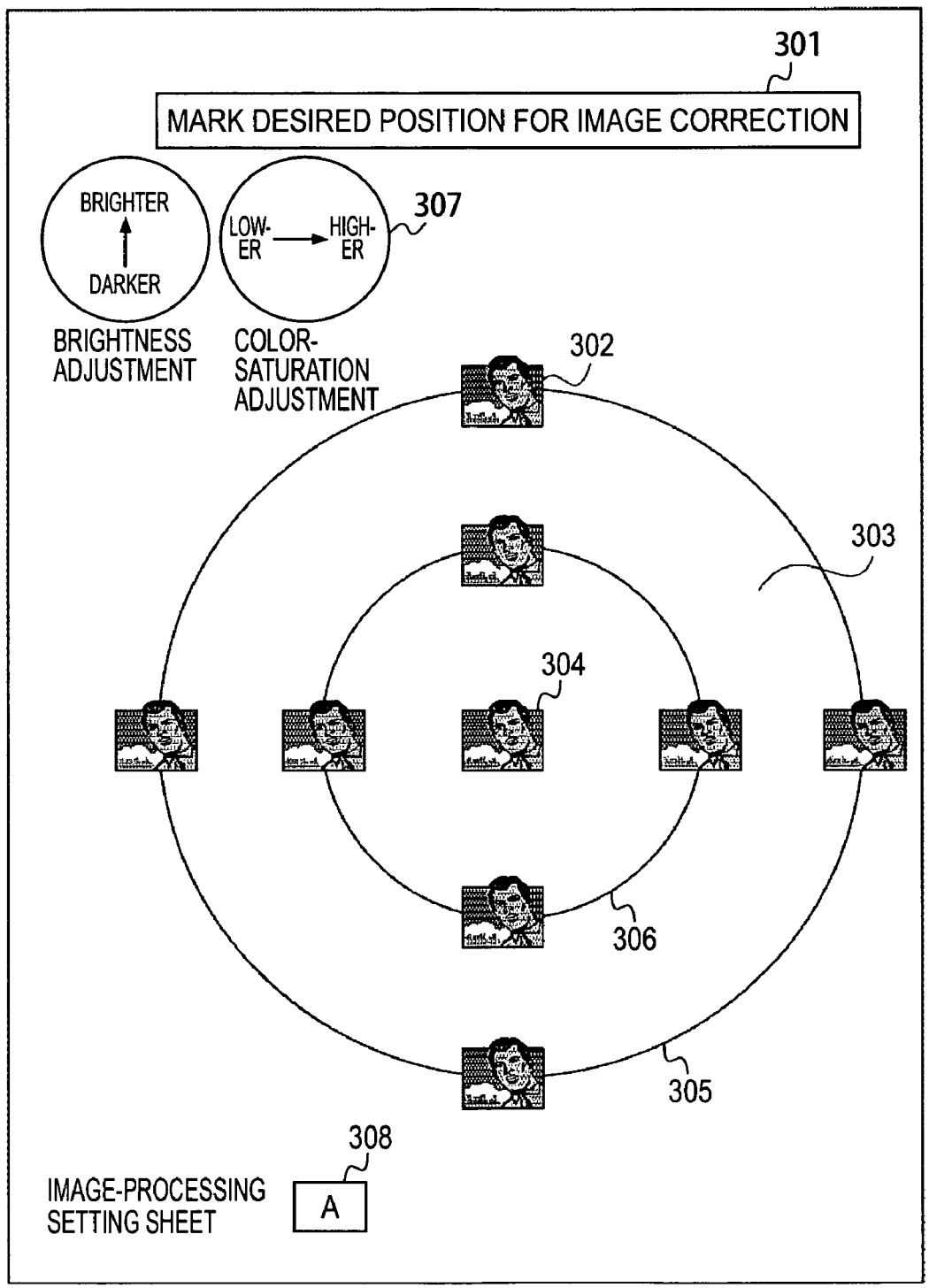
FIG. 3 illustrates an example of a printed setting sheet used for setting image-processing parameter values for the brightness and color saturation according to a first embodiment of the present invention.

FIG. 3 illustrates an example of a printed setting sheet according to a first embodiment. The setting sheet is provided with a guide region 301 that gives a general outline of the setting sheet. In the center of circles shown in FIG. 3 is disposed a sample image 304 which is the basis of each image-processing parameter. A sample image 302 having the maximum possible image-processing parameter value is disposed in an outermost position from the sample image 304 in the 12 o'clock direction. Moreover, an outer circle 305 is printed as a guiding line to define a marking range. An effective marking range 303 is disposed within the outer circle 305. Furthermore, a mid-circle 306 defines a range for a group of sample images each corresponding to an intermediate value between the central value and the maximum value of an image-processing parameter or to an intermediate value between the central value and the minimum value of an image-processing parameter. In the first embodiment, the image-processing parameters include the brightness and the color saturation. These parameters may be selected by a user via the operating portion 1006. Guides 307 indicate the directions in which the image-processing parameter values vary. Specifically, the guide 307 on the left indicates that the sample images are arranged in a manner such that the images in the upper portion of the circles are brighter than the images in the lower portion and the guide 307 on the right indicates that the color saturation of the sample images changes in the horizontal direction. Consequently, the sample image 302 in the 12 o'clock position has the maximum image-processing parameter value for the brightness and the sample image in the 6 o'clock position has the minimum image-processing parameter value for the brightness. In the horizontal direction, the image-processing parameter value for the color saturation is set at minimum in the 9 o'clock position, and increases towards a maximum color saturation at the 3 o'clock position. The relationship between the positioning of the images and the image-processing parameter values will be described later in detail. An image-processing setting-sheet identifier 308 indicates that the sheet is an image-processing setting sheet.

As described above, in the first embodiment, the printed setting sheet shows the degree of variation in the sample images by having the sample images arranged in a circular manner. When there are two image-processing parameters as in the first embodiment, e.g. the brightness and the color saturation, the sample images may alternatively be arranged rectangularly in the vertical and horizontal directions. Moreover, the arrangement of the sample images is freely adjustable depending on the application, such as the number of image-processing parameters and the allowable range of the parameter values.

Figure 4:
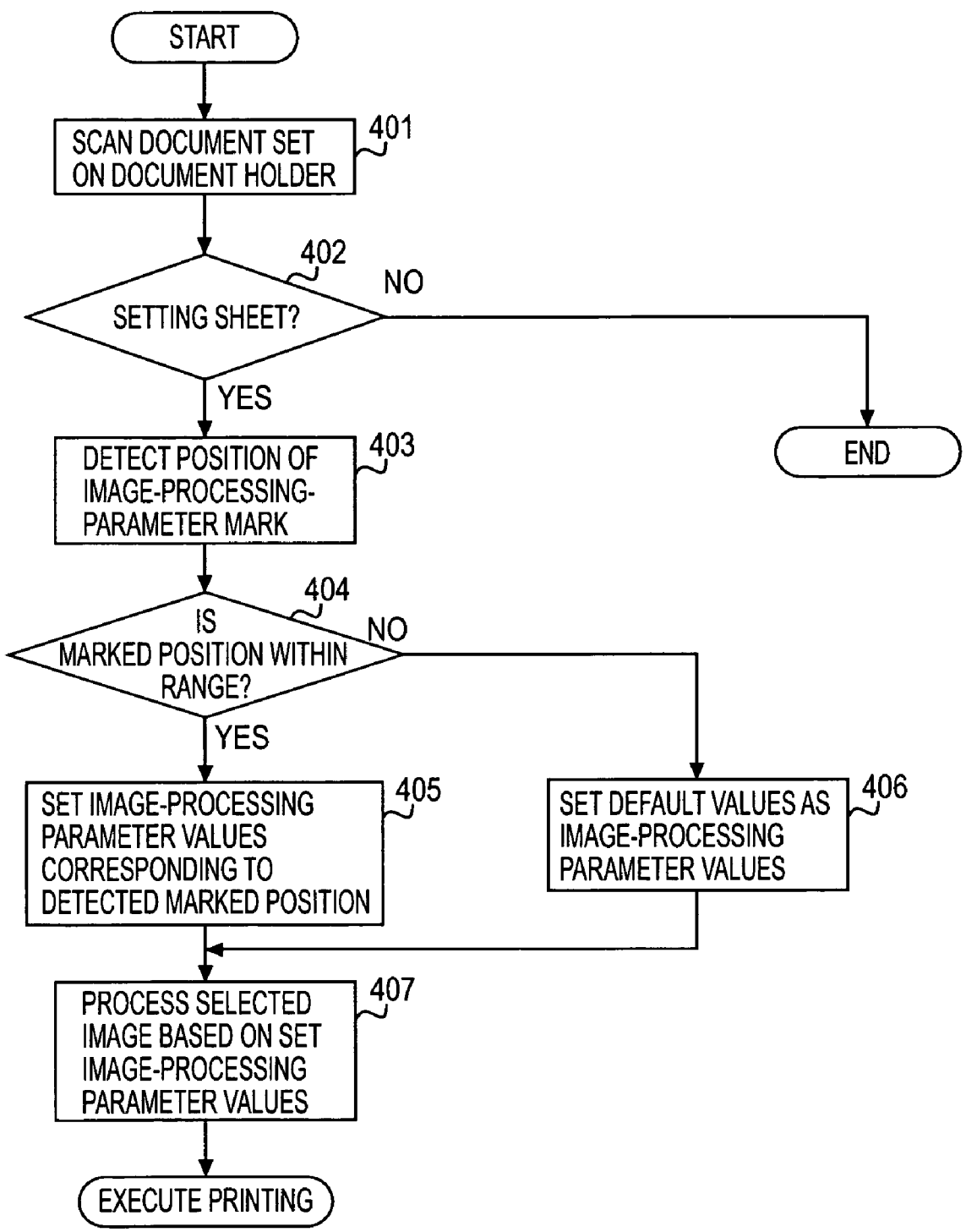
FIG. 4 is a flow chart illustrating a procedure for setting the image-processing parameter values according to the first embodiment of the present invention.

FIG. 4 is a flow chart illustrating a procedure for setting image-processing parameter values based on a position marked on the setting sheet. In this flow chart, the MFP 1000 is preliminarily operated to print out the setting sheet, and the setting sheet is already provided with a mark.

In step 401, the operating portion 1006 of the MFP 1000 is operated in order to scan the document set on the document holder. In step 402, it is determined whether the scanned document is a setting sheet. This determination for a setting sheet is achieved based on the presence of the image-processing setting-sheet identifier 308. In step 402, if it is determined that the scanned document is not a setting sheet, the operation ends without proceeding on to the following steps. In that case, the LCD 1005 of the MFP 1000 may display a message indicating that the scanned document is not a setting sheet. On the other hand, if the scanned document is determined to be a setting sheet in step 402, the marked position for determining the image-processing parameter values is detected in step 403. In step 404, it is determined whether the marked position detected in step 403 is within an appropriate range. If it is determined that the marked position is not within the appropriate range in step 404, the operation proceeds to step 406 where predetermined default values are set as the image-processing parameter values. Alternatively, in a case where the marked position is not within the appropriate range, it may be determined that the marked position is an error and the user may be notified in step 406 to mark a position again. On the other hand, if the marked position is determined to be within the appropriate range in step 404, the operation proceeds to step 405 where values corresponding to the marked position are set as the image-processing parameter values.

Figure 5:
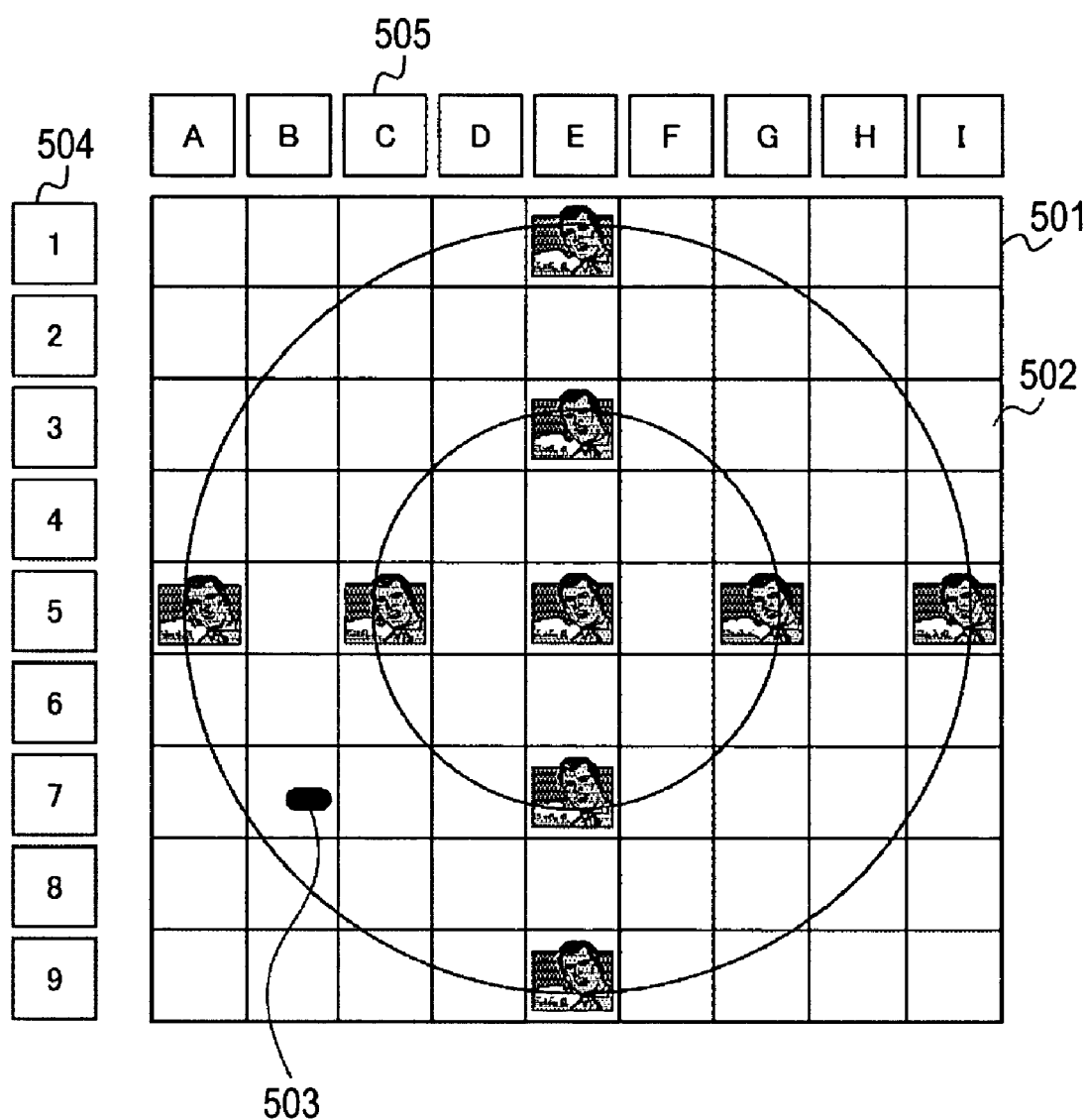
FIG. 5 is a correspondence diagram between a marked position and set values used for setting the image-processing parameter values for the brightness and color saturation according to the first embodiment of the present invention.

The image-processing parameter values are determined on the basis of a correspondence diagram shown in FIG. 5. FIG. 5 includes a plurality of divided sections such that the marked position and the image-processing parameter values correspond to each other in a one-to-one fashion. In FIG. 5, a 9×9 square region 501 completely covers the range of the circles shown in FIG. 3. The square region 501 is divided into a plurality of square sections 502 each having the corresponding image-processing parameter values preliminarily set therein. The values for the image processing parameters in each square section 502 correspond to each other in a one-to-one fashion. The parameter values are set in a coordinate system on an image-processing-parameter table shown in Table 1, and are stored in, for example, the image-processing unit 208 or a memory (not shown) for storing the parameter table. Furthermore, because the square region completely covers the range of the circles, even if the position marked by the user is slightly deviated from the desired position, the desired image-processing parameter values can still be reflected. A mark 503 designated by the user is used for determining image-processing parameter values. If the mark 503 is not present within the square region 501, it is determined in the above-mentioned step 404 that the mark is not within the appropriate range. Numbers 504 representing the positions of the square sections 502 are shown in the row (horizontal) direction and characters 505 representing the positions of the square sections 502 are shown in the column (vertical) direction. In this example, the mark 503 belongs to section 7-B in the 9×9 square region 501. By reading out the values corresponding to section 7-B from the image-processing-parameter table, the image-processing parameter values corresponding to the marked position can be determined. In this case, the values corresponding to section 7-B are BR(−2)

and CS(−3) as shown in Table 1. Accordingly, the image-processing parameters values are set at −2 for the brightness and −3 for the color saturation.

TABLE 1

|   | A | B | C | D | E | F | G | H | I |
|---|---|---|---|---|---|---|---|---|---|
| 1 | BR(+4) | BR(+4) | BR(+4) | BR(+4) | BR(+4) | BR(+4) | BR(+4) | BR(+4) | BR(+4) |
|   | CS(−4) | CS(−3) | CS(−2) | CS(−1) | CS(±0) | CS(+1) | CS(+2) | CS(+3) | CS(+4) |
| 2 | BR(+3) | BR(+3) | BR(+3) | BR(+3) | BR(+3) | BR(+3) | BR(+3) | BR(+3) | BR(+3) |
|   | CS(−4) | CS(−3) | CS(−2) | CS(−1) | CS(±0) | CS(+1) | CS(+2) | CS(+3) | CS(+4) |
| 3 | BR(+2) | BR(+2) | BR(+2) | BR(+2) | BR(+2) | BR(+2) | BR(+2) | BR(+2) | BR(+2) |
|   | CS(−4) | CS(−3) | CS(−2) | CS(−1) | CS(±0) | CS(+1) | CS(+2) | CS(+3) | CS(+4) |
| 4 | BR(+1) | BR(+1) | BR(+1) | BR(+1) | BR(+1) | BR(+1) | BR(+1) | BR(+1) | BR(+1) |
|   | CS(−4) | CS(−3) | CS(−2) | CS(−1) | CS(±0) | CS(+1) | CS(+2) | CS(+3) | CS(+4) |
| 5 | BR(±0) | BR(±0) | BR(±0) | BR(±0) | BR(±0) | BR(±0) | BR(±0) | BR(±0) | BR(±0) |
|   | CS(−4) | CS(−3) | CS(−2) | CS(−1) | CS(±0) | CS(+1) | CS(+2) | CS(+3) | CS(+4) |
| 6 | BR(−1) | BR(−1) | BR(−1) | BR(−1) | BR(−1) | BR(−1) | BR(−1) | BR(−1) | BR(−1) |
|   | CS(−4) | CS(−3) | CS(−2) | CS(−1) | CS(±0) | CS(+1) | CS(+2) | CS(+3) | CS(+4) |
| 7 | BR(−2) | BR(−2) | BR(−2) | BR(−2) | BR(−2) | BR(−2) | BR(−2) | BR(−2) | BR(−2) |
|   | CS(−4) | CS(−3) | CS(−2) | CS(−1) | CS(±0) | CS(+1) | CS(+2) | CS(+3) | CS(+4) |
| 8 | BR(−3) | BR(−3) | BR(−3) | BR(−3) | BR(−3) | BR(−3) | BR(−3) | BR(−3) | BR(−3) |
|   | CS(−4) | CS(−3) | CS(−2) | CS(−1) | CS(±0) | CS(+1) | CS(+2) | CS(+3) | CS(+4) |
| 9 | BR(−4) | BR(−4) | BR(−4) | BR(−4) | BR(−4) | BR(−4) | BR(−4) | BR(−4) | BR(−4) |
|   | CS(−4) | CS(−3) | CS(−2) | CS(−1) | CS(±0) | CS(+1) | CS(+2) | CS(+3) | CS(+4) |

(BR = brightness; CS = color saturation)

Subsequently, in step 407, image processing is performed based on the image-processing parameter values set in step 405 or step 406. Specifically, the memory-card controlling unit 209 reads out an image file. The image-processing unit 208 then expands the image file and performs image processing based on the image-processing parameter values set in step 405 or step 406.

In the subsequent printing operation, the image-processing unit 208 performs image processing, such as scaling, coloring, and binarizing. Furthermore, the print-engine controlling unit 207 controls the feeding of paper and the print head. However, a detailed description of such a series of control processes and its procedure will not be provided here since they can be achieved with a known technique and do not affect the essence of the present invention.

Accordingly, in a case where two image-processing parameter values each have nine possible levels, it is not required in the present invention to print 81 sample images corresponding to the 9×9 divided square sections 502 shown in FIG. 5 for marking a desired position. Instead, according to the present invention, the image-processing parameter values can be set properly based on the marked position with a smaller number of sample images.

Second Embodiment

Figure 6:
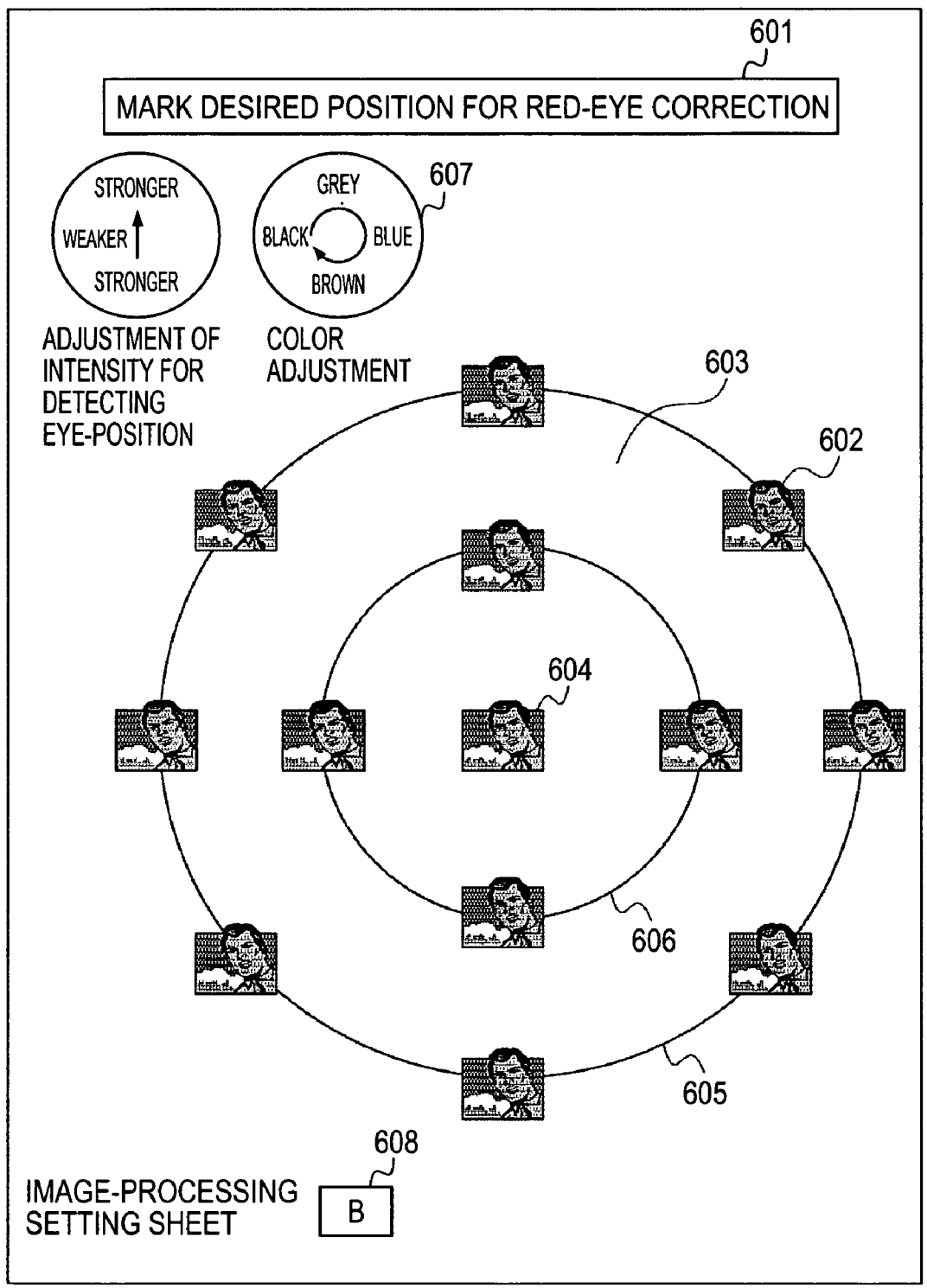
FIG. 6 illustrates an example of a printed setting sheet used for setting image-processing parameter values for red-eye correction according to a second embodiment of the present invention.

A second embodiment will now be described. In the second embodiment, the essence of the present invention is directed to red-eye correction. FIG. 6 illustrates an example of a printed setting sheet used for red-eye correction. Similar to FIG. 3, the setting sheet for red-eye correction is provided with a guide region 601 that gives a general outline of the setting sheet. In the center of circles shown in FIG. 6 is disposed a sample image 604 which is the basis of the image-processing parameter. Moreover, an outer circle 605 is printed as a guiding line to define the marking range. An effective marking range 603 is disposed within the outer circle 605. Unlike the setting sheet in the first embodiment, the second embodiment is provided with sample images 602 having different parameter values arranged along the outer circle 605 so that the degree of variation in the sample images can be checked more easily. Furthermore, a mid-circle 606 defines a range for a group of sample images whose image-processing parameter values vary consecutively. Guides 607 indicate the directions in which the image-processing parameter values vary. The guide 607 on the left indicates that the sample images are arranged in a manner such that the intensity for detecting the eye region for red-eye correction varies from the center of the circles toward the outer periphery of the circle 605, and the guide 607 on the right indicates that the sample images are arranged in a manner such that the eye color varies in the clockwise direction. An image-processing setting-sheet identifier 608 indicates that the sheet is an image-processing setting sheet.

A procedure for setting image-processing parameter values based on a position marked on the setting sheet according to the second embodiment is similar to the procedure shown in the flow chart of FIG. 4 according to the first embodiment. Therefore, step 401 to step 404 in the flow chart of FIG. 4 according to the first embodiment are similarly applied to the second embodiment, and the detailed description of those steps will not be repeated.

Figure 7:
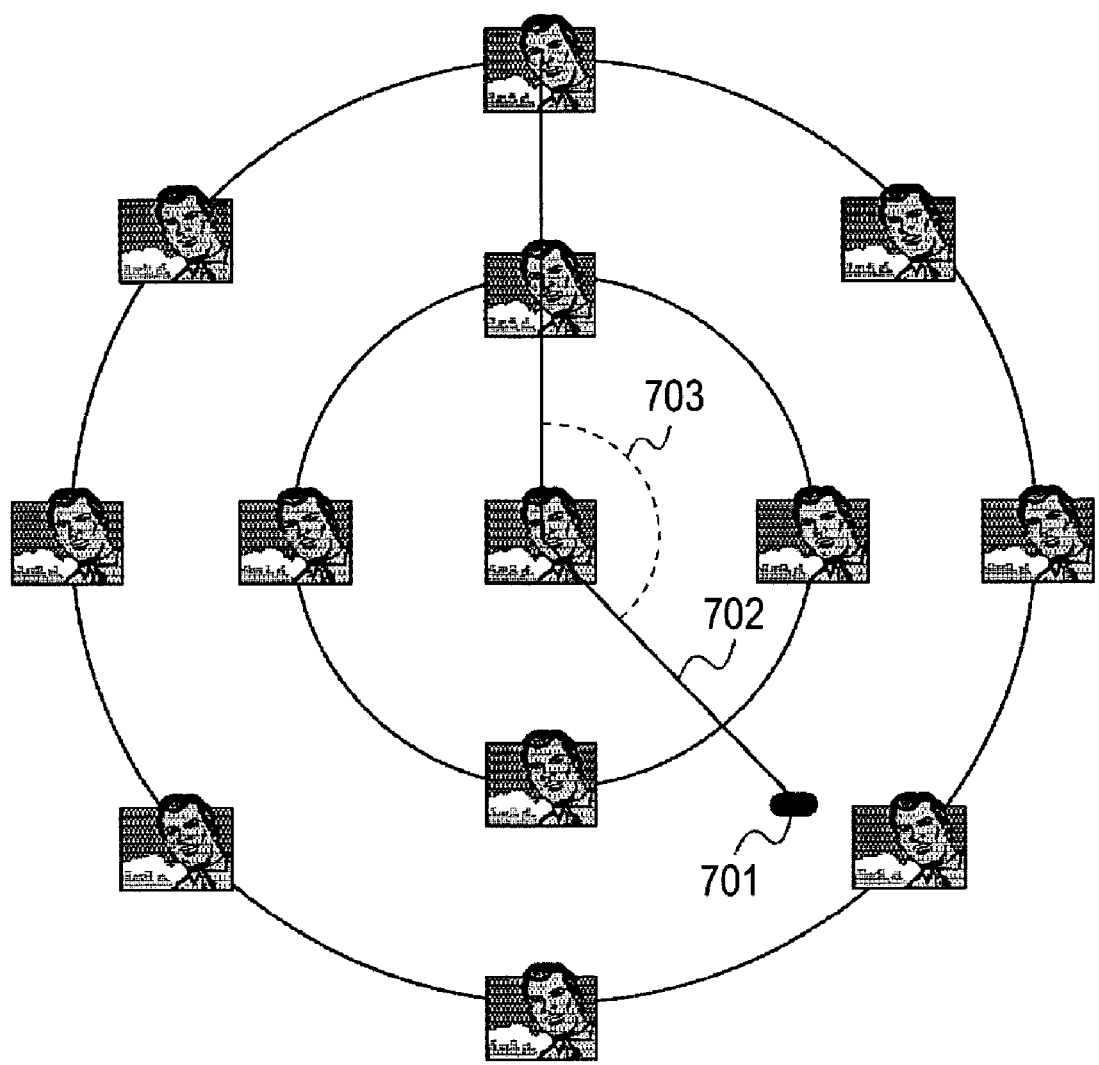
FIG. 7 illustrates the distance and the angle of the marked position used as a basis for determining the image-processing parameter values for red-eye correction according to the second embodiment of the present invention.

The process for setting image-processing parameter values in step 405 will be described below with reference to FIG. 7. FIG. 7 illustrates the distance and the angle of the marked position used as a basis for determining image-processing parameter values for red-eye correction. A mark 701 designated by the user is used for determining image-processing parameter values. A distance 702 from the center of the circles to the marked position is indicated. An angle 703 of the marked position measured from a line extending in the 12 o'clock direction having a reference angle of 0° is shown. The mark 701 designated by the user is analyzed by the document-analyzing unit 204 in step 403 that the mark 701 is distant from the center of the outer circle 605 by 80% of the radius thereof, and is positioned 130° from the 12 o'clock position in the clockwise direction. In a case where the analysis shows that the distance exceeds 100% of the radius of the outer circle 605, it will be determined in step 404 that the marked position is not within the appropriate range. In that case, predetermined default values are set as the parameter values.

FIG. 8 shows correspondence graphs for determining parameter values for red-eye correction based on the distance and the angle of the marked position with respect to the center of the circles.

Figure 8A:
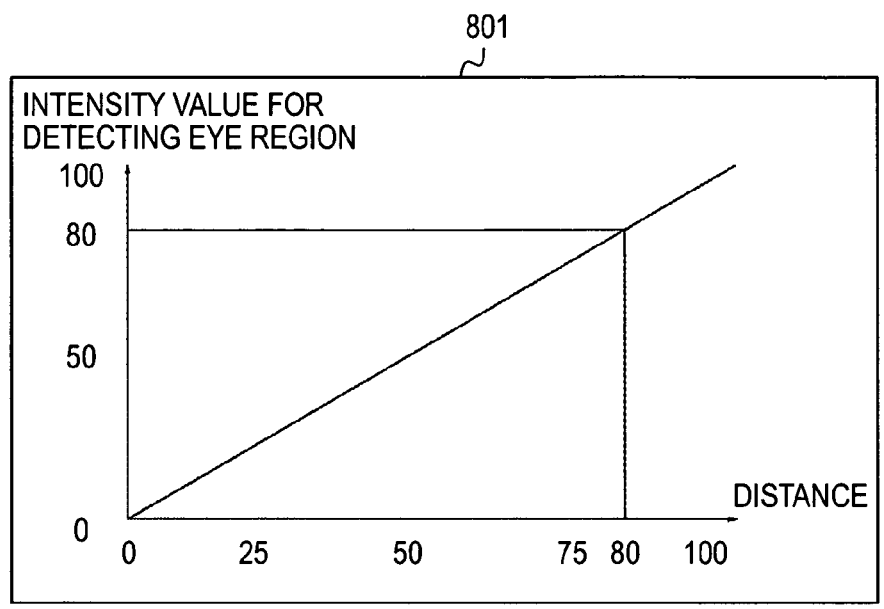
FIG. 8 includes graphs corresponding to the values of the distance and the angle of the marked position used as a basis for determining the image-processing parameter values for red-eye correction according to the second embodiment of the present invention.

Specifically, FIG. 8A illustrates a graph 801 showing the correspondence relationship between the distance from the center of the circles to the marked position and the detection intensity. The abscissa axis represents the distance between the center of the circles and the marked position. The ordinate axis represents the intensity value for detecting the eye region. The detection capability for the eye region becomes more moderate or higher as the intensity value approaches 100. In other words, with a higher intensity value, there is a higher capability to detect the eye region. On the other hand, the detection capability for the eye region becomes lower as the intensity value approaches 0. Since the relationship between the intensity value and the distance from the center of the circles to the marked position is shown linearly in graph 801, a distance value obtained by the document-analyzing unit 204 can be used directly as a value for detecting the eye region. Alternatively, in graph 801, a curve suitable for the characteristic of each image may be produced dynamically by analyzing the subject image data so that the curve is used for determining a value for detecting the eye region. In the graph 801, the intensity value for eye-region detection at the position of the mark 701 is set at 80.

Figure 8B:
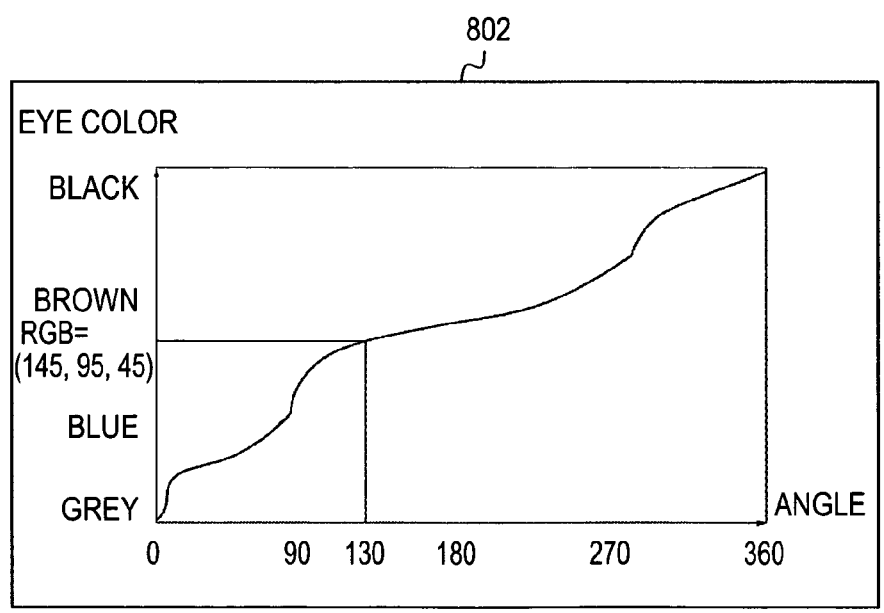

FIG. 8B illustrates a graph 802 that shows the correspondence relationship between the eye color and the angle. The abscissa axis represents the angle from the line extending in the 12 o'clock direction. The ordinate axis represents the eye color. Although the eye color in graph 802 is expressed with the names of specific colors, the eye color is actually mapped with discrete values (not shown) based on, for example, RGB or CMYK expression. In actual image processing, the calculation for the image processing is implemented based on these discrete values. In this case, an 8-bit RGB expression is used, and the RGB values corresponding to 130° are set at 145, 95, and 45. The above process is implemented in step 405.

Similar to the first embodiment, in step 406, since it is determined in step 403 that the marked position is not within the appropriate range, predetermined default values are set as the image-processing parameter values.

Subsequently, in step 407, the red-eye correction process is implemented based on the parameter values set in step 405 or step 406. Similar to the first embodiment, a detailed description of the subsequent printing operation is not provided here.

Consequently, the present invention eliminates the need to print every single sample image that corresponds to a consecutive change in parameter values. According to the present invention, the image-processing parameter values can be set properly with a smaller number of sample images by designating a marked position for determining the image-processing parameter values.

In the second embodiment, as the parameter for red-eye correction, the eye color and the intensity for detecting the eye region are given as examples of parameter items. Alternatively, the second embodiment is not limited to the above-referenced parameter items or the combination of the parameter items, and may be applied similarly to other types of parameter items.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-106288 filed Apr. 1, 2005, which is hereby incorporated by reference herein in its entirety.

What is claimed is:

1. An image processing device comprising:
a print control unit configured to cause a printing apparatus to print a setting sheet used for setting a value of at least one parameter for image processing, the setting sheet including sample images corresponding to values of the at least one parameter, the number of the sample images included on the setting sheet being smaller than the number of the values that can be designated by a user of the at least one parameter;
an acquiring unit configured to acquire a sheet image obtained by reading, by a reading apparatus, of the setting sheet printed by the print control unit;
a determining unit configured to determine a position of a mark given by a user on the setting sheet, based on the sheet image acquired by the acquiring unit; and
a setting unit configured to set a value of the at least one parameter according to a position of the mark on the setting sheet determined by the determining unit,
wherein, in a case where a position of the mark on the setting sheet determined by the determining unit corresponds to an area between two sample images included on the setting sheet, the setting unit sets a value between the values corresponding to the two sample images.

2. The image processing device according to claim 1, wherein at least one of the sample images included on the setting sheet corresponds to an upper limit value, or a lower limit value of the values for the at least one parameter.

3. The image processing device according to claim 1, wherein the print control unit causes a printing apparatus to print sample images corresponding to values of a plurality of parameters, and the setting unit sets values of the parameters according to a position of the mark determined by the determining unit.

4. The image processing device according to claim 3, wherein
in a case where a position of the mark on the setting sheet determined by the determining unit corresponds to an area between two sample images included on the setting sheet, the setting unit sets values of the parameters between the values corresponding to the two sample images.

5. The image processing device according to claim 1, wherein the at least one parameter includes at least one of the brightness, the color saturation, and a combination of the brightness and color saturation.

6. The image processing device according to 1, wherein the at least one parameter includes at least red-eye correction.

7. An image processing method comprising:
causing a printing apparatus to print a setting sheet used for setting a value of at least one parameter for image processing, the setting sheet including sample images corresponding to values of the at least one parameter, the number of the sample images included on the setting sheet being smaller than the number of the values that can be designated by a user of the at least one parameter;
acquiring a sheet image obtained by reading, by a reading apparatus, of the setting sheet printed by the printing apparatus;
determining a position of a mark given by a user on the setting sheet, based on the acquired sheet image; and
setting a value of the at least one parameter according to a determined position of the mark on the setting sheet,
wherein, in a case where a determined position of the mark on the setting sheet corresponds to an area between two sample images included on the setting sheet, a value is set between the values corresponding to the two sample images.

8. The image processing method according to claim 7, wherein at least one of the sample images included on the setting sheet an upper limit value, or a lower limit value of the values for the at least one parameter.

9. The image processing method according to claim 7, wherein sample images corresponding to values of a plurality of parameters is printed by a printing apparatus, and values of a plurality of the parameters is set according to a determined position of the mark.

10. The image processing method according to claim 9, wherein in a case where a determined position of the mark on the setting sheet corresponds to an area between two sample images included on the setting sheet, values of the parameters are set between the values corresponding to the two sample images.

* * * * *